United States Patent [19]

Rummelsburg

[11] Patent Number: 4,552,284

[45] Date of Patent: Nov. 12, 1985

[54] COOKWARE BOTTOM WALL STRUCTURE

[75] Inventor: Al S. Rummelsburg, Scarsdale, N.Y.

[73] Assignee: Kidde Consumer Durables Corp., Bronx, N.Y.

[21] Appl. No.: 602,308

[22] Filed: May 30, 1984

Related U.S. Application Data

[62] Division of Ser. No. 403,828, Jul. 30, 1982, Pat. No. 4,511,077.

[51] Int. Cl.[4] .............................................. B44D 1/14
[52] U.S. Cl. .................................. 220/453; 220/94 R; 220/68
[58] Field of Search ................. 220/453, 442, 443, 68, 220/94 R

[56] References Cited

U.S. PATENT DOCUMENTS

| | | |
|---|---|---|
| 2,079,126 | 5/1937 | Maas ............................ 220/94 R X |
| 2,171,040 | 8/1939 | Merritt et al. . |
| 2,395,602 | 2/1946 | Wittenberg ................... 220/94 R X |
| 3,173,202 | 3/1965 | Farber . |
| 3,837,895 | 9/1974 | Pryor et al. ..................... 220/453 X |

FOREIGN PATENT DOCUMENTS

| | | | |
|---|---|---|---|
| 638764 | 4/1962 | Italy ...................................... 220/68 |
| 423415 | 11/1966 | Switzerland ......................... 220/68 |
| 505955 | 5/1939 | United Kingdom .................. 220/68 |

Primary Examiner—Steven M. Ponard
Attorney, Agent, or Firm—Seidel, Gonda, Goldhammer & Abbott

[57] ABSTRACT

The outer surface of a stainless steel utensil and one surface of an aluminum disk are cleaned and then separately heated at different temperatures. Thereafter, the disk is superimposed over the utensil and metallurgically bonded directly thereto by the application of pressure.

7 Claims, 10 Drawing Figures

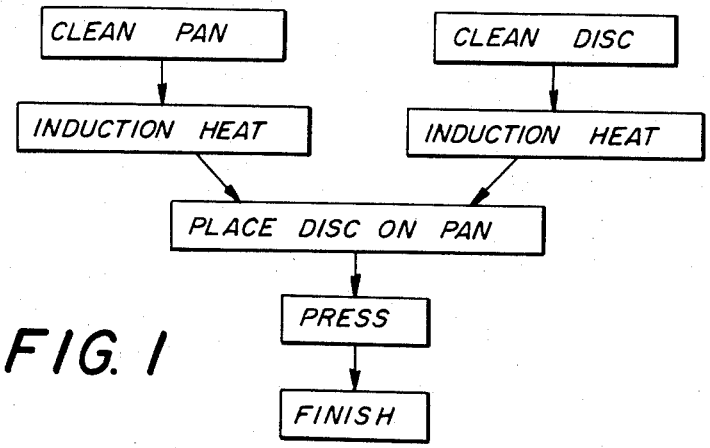
FIG. 1
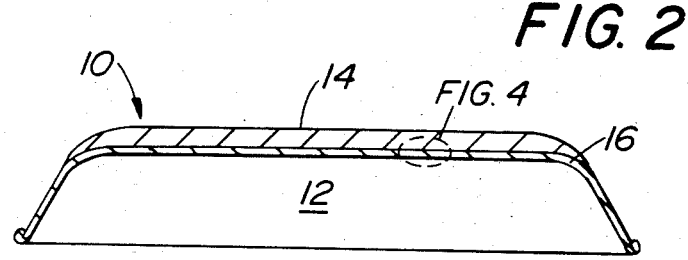
FIG. 2
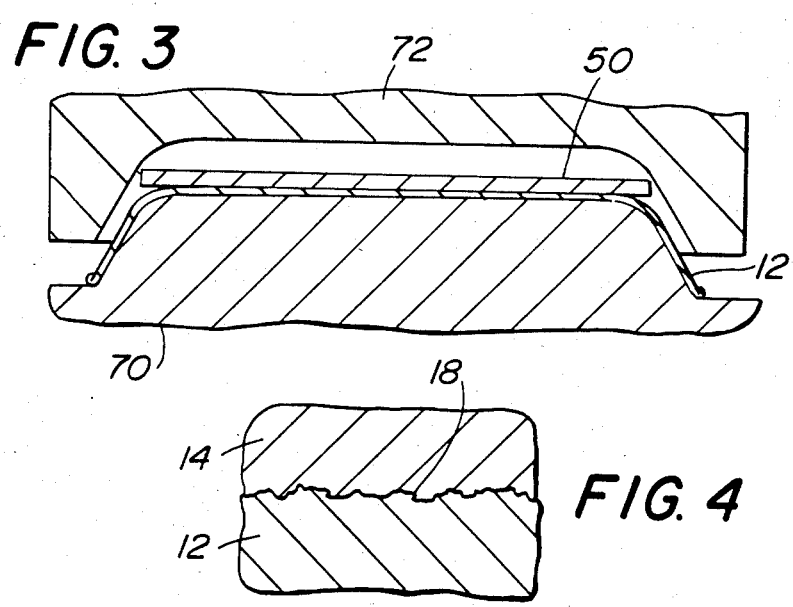
FIG. 3
FIG. 4

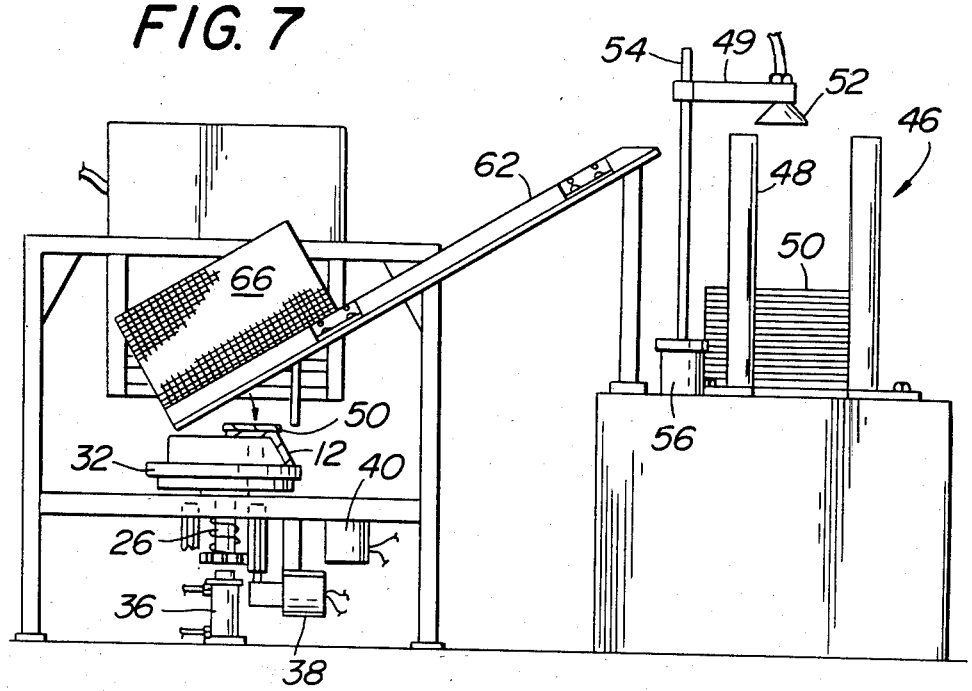
FIG. 7
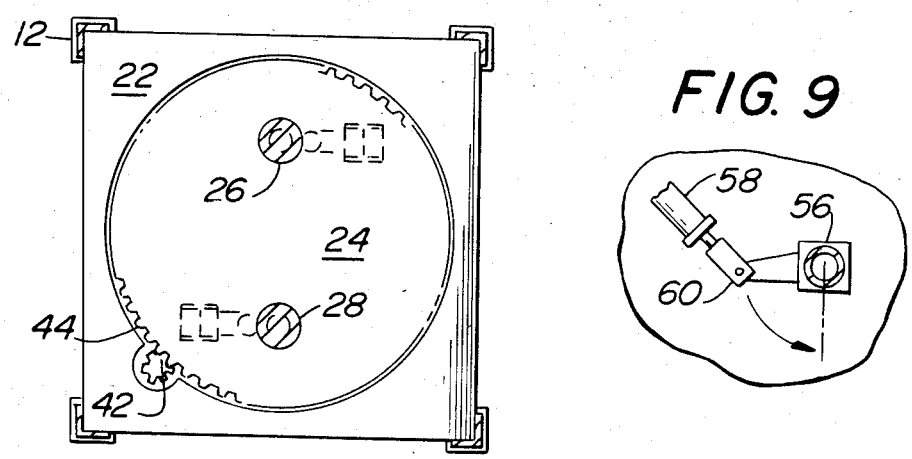
FIG. 8
FIG. 9

COOKWARE BOTTOM WALL STRUCTURE

This is division, of application Ser. No. 403,828, filed July 30, 1982, now U.S. Pat. No. 4,511,077.

BACKGROUND

Aluminum clad cookware per se is known. U.S. Pat. No. 2,171,040 teaches producing strips of stainless steel clad with aluminum which are then cut and deep drawn to form the cooking utensil. Production of clad cookware in accordance with said patent requires the entire outer surface of the utensil to be defined by the aluminum layer.

U.S. Pat. No. 3,173,202 teaches a utensil wherein only the bottom surface of the utensil is clad with a layer of aluminum. U.S. Pat. No. 3,173,202 teaches the application of an aluminum spray to the bottom surface of the stainless steel utensil and thereafter bonding an aluminum disk to the aluminum spray.

The apparatus for applying aluminum spray is costly and noisy. In view of the noise associated with such apparatus, government regulations require that the spray station be soundproofed for the protection of workers. The use of an aluminum spray requires an extra finnishing step to remove overspray. The present invention is directed to the problem of producing a stainless steel utensil having an aluminum disk bonded only to the bottom surface of the utensil but without using an aluminum spray as taught by the last-mentioned patent. It has been found that the aluminum spray step can be eliminated and at the same time produce a stronger utensil having a more uniform bond which in turn provides better heat transfer for quicker heating of foods. Also, it was found that the utensil can be manufactured less expensively while increasing production. In order to eliminate the aluminum spray, it was found that it was necessary to change the heating method for heating the disk and utensil, change the heating temperature only for the utensil, increase the pressure for bonding the disk to the utensil, and that the utensil and disk are preferably heated separately.

SUMMARY OF THE INVENTION

The present invention is directed to a stainless steel utensil having a bottom wall connected to an upstanding side wall by a curved portion. An aluminum disk is bonded directly to the bottom wall and the curved portion. The bond is characterized by a serrated interface. The disk is thinner at its periphery and terminates where the side wall joins said curved portion.

The present invention also includes a method of making cookware including the steps of cleaning one surface of a stainless steel utensil and an aluminum disk. The disk and utensil are separately heated in a manner which avoids hot spots until the temperature of the pan is 800°–1200° F. with the temperature of the disk being 500°–750° F. Thereafter, the disk is positioned over the bottom wall of the utensil. Pressure is applied to the disk and utensil bottom wall in a press to bond the disk directly to the bottom wall.

It is an object of the present invention to provide novel cookware and novel method of making the same.

It is another object of the present invention to provide an aluminum-stainless steel cookware which can be manufactured at an increased rate with increased bond strength which is more uniform so as to provide for quicker heating.

It is another object of the present invention to provide a method of making cookware without using aluminum spray and wherein the stainles steel utensil is shaped before being bonded to an aluminum disk.

It is another object of the present invention to provide a novel method of making cookware which takes advantage of the different softening temperatures of aluminum and stainless steel.

Other objects and advantages will appear hereinafter.

For the purpose of illustrating the invention, there is shown in the drawings a form which is presently preferred; it being understood, however, that this invention is not limited to the precise arrangements and instrumentalities shown.

FIG. 1 is a block diagram of steps in accordance with the method of the present invention.

FIG. 2 is a sectional view through cookware made in accordance with the present invention.

FIG. 3 is an enlarged detail view of the utensil and disk just prior to application of pressure to effect a bond.

FIG. 4 is an enlarged detail view of the interface as indicated in FIG. 2.

FIG. 7 is a side elevation view of the apparatus but opposite to that shown in FIG. 5.

FIG. 8 is a sectional view taken along the line 8—8 in FIG. 5.

FIG. 9 is a sectional view taken along the line 9—9 in FIG. 5.

DETAILED DESCRIPTION

Figure 5:
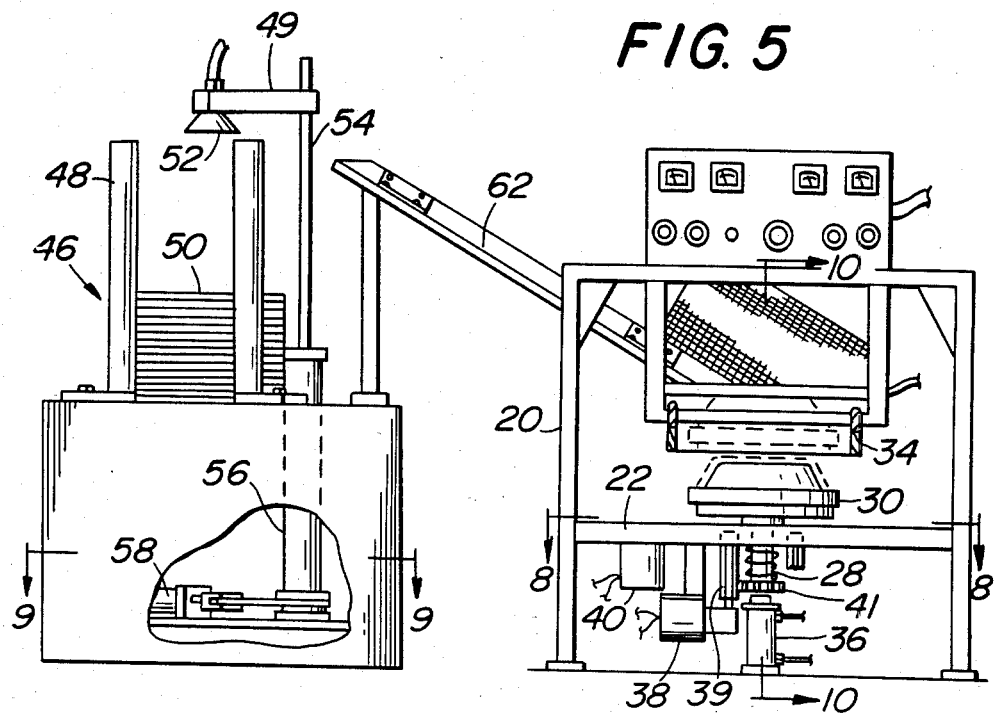
FIG. 5 is a side elevation view of apparatus for practicing the present invention.

Referring to the drawings in detail, wherein like numerals indicate like elements, there is shown in FIG. 2 cookware in accordance with the present invention designated generally as 10. In FIG. 1, there is shown a block diagram of the sequence of major steps in manufacturing the cookware 10. The cookware 10 includes a stainless steel utensil 12 with an aluminum disk 14 bonded to the bottom wall. The utensil 12 may have any conventional utensil shape and need not be a frying pan as illustrated. The aluminum disk 14 overlies the bottom wall of the pan 12 and overlies the curved portion 16 wherein the bottom wall of the utensil meets the upstanding side wall. The aluminum disk 14 is bonded directly to the bottom wall of the utensil 12 with a serrated interface 18 as shown in FIG. 4. The serrations have a wave length of about 5 to 15 microns and a depth of about 1 micron and due to their shape key the aluminum disk to the utensil. The disk and bottom wall of the utensil are slightly concave in the center.

The aluminum disk 14 is preferably an aluminum alloy type 1100-0. The stainless steel utensil 12 is any 200 series or 300 series and is preferably type 201. The chemical processing of the stainless steel is believed to be the most significant determinant of serration depth with thermal and mechanical processing controlling the size and pattern geometry of serrations. The serration spacing corresponds to grain size and is attained by a grain boundary acid etch. The etched steel surface is effective in three respects. It provides a grooved surface into which the aluminum can be forced, thereby keying the two metals together. It provides a bonding surface which is relatively oxide-free. Also, it provides a high coefficient of friction surface which restricts lateral flow of the aluminum during bonding.

The 201 stainless steel is preferably processed at the mill by air anneal for about 35–40 minutes per inch of metal thickness to attain a grain size of about 5–15 microns, then pickled in cold 12% $H_2SO_4$ electrolytically, then etched at grain boundaries in cold 10–12% $HNO_3$, 1% HF. The preferred grain size is 7–10 microns.

The thickness of the aluminum varies with the diameter of the utensil. With a stainless steel utensil having a diameter less than about 20 centimeters, the aluminum disk will have a thickness of about 23 millimeters. When the utensil has a diameter greater than about 20 centimeters, the aluminum disk has a thickness of about 50 millimeters. Regardless of the diameter of the utensil, it has a wall thickness of about 6 millimeters. It has been found that cookware made in accordance with the present invention have a bond strength between the stainless steel utensil and the aluminum disk which is approximately twice the bond strength attained by cookware made in accordance with U.S. Pat. No. 3,173,202.

Referring to FIGS. 5–10, there is illustrated one form of apparatus for practicing the present invention. A frame 20 supports a control unit containing switches, dials, gauges, etc. A platform 22 on the frame 20 supports a table 24 for rotation about a vertical axis. Table 24 has two positions with shafts 26 and 28 depending therefrom. The shafts 26, 28 are diammetrically opposite one another. See FIGS. 8 and 10. Each shaft is spring biased downwardly and has its upper end connected to a pan holder. Thus, shaft 28 is connected to pan holder 30 and shaft 26 is connected to pan holder 32. In the position illustrated in FIG. 10, pan holder 30 is beneath an induction heater 34 which has a temperature range of 1000°–1200° F. and preferably is set at 1100° F.

Figure 10:
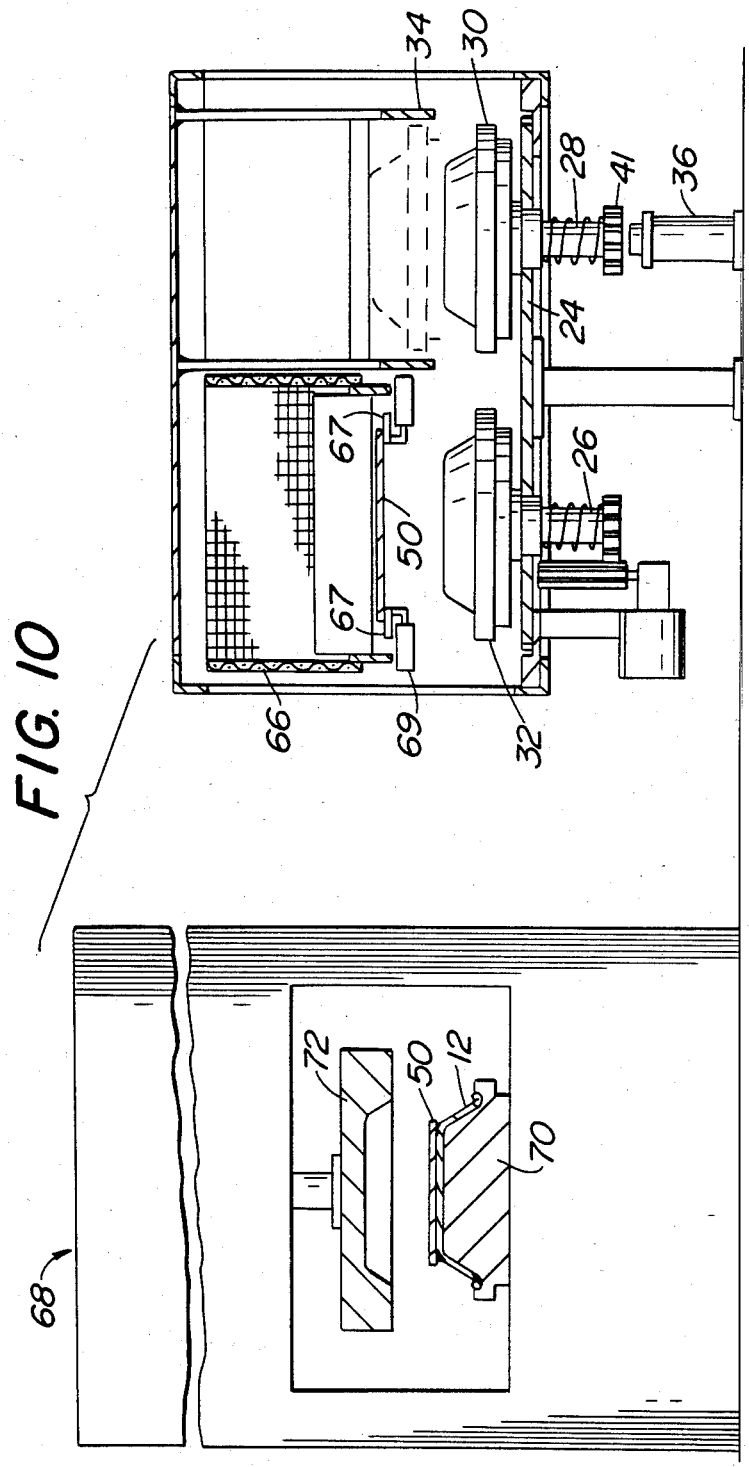
FIG. 10 is a sectional view taken along the line 10—10 in FIG. 5.

A cylinder 36 is provided directly beneath shaft 28 when shaft 28 is in the position shown in FIG. 10. A piston rod associated with cylinder 36 is adapted to be moved upwardly by fluid pressure and thereby raise the pan holder 30 from the solid line position to the phantom position as shown in FIG. 10. When pan holder 30 is in the phantom position 10, a utensil supported thereby will be raised in temperature by the induction heater 34. Before being heated the utensil is cleaned to remove grease and foreign matter.

An electrical motor 38 is supported by the table 24 for movement therewith. The output of motor 38 is connected by a splined shaft 39 to a gear 41 on the shaft 28. When cylinder 36 is activated to raise the pan holder 30, motor 29 is activated to rotate the pan holder. Rotation of a pan supported by the pan holder 30 while subjected to induction heat avoids hot spots. The outer periphery of table 24 has a gear 44 meshed with a pinion 42. Pinion 42 is driven by electrical motor 40 which in turn is supported by the table 24. Motor 40 is intermittantly activated to rotate the table 24 and pan holders 30, 32 when cylinder 36 is deactivated and pan 30 has been returned from the phantom position to the solid line position as shown in FIG. 10.

As shown in the lefthand end of FIG. 5, there is provided a disk feeder designated generally as 46. The disk feeder 46 includes a plurality of upright cylindrical posts 48 which defined a retainer for a stack of aluminum disks 50 which have been cleaned to remove grease and foreign matter. A support not shown maintains the uppermost disk 50 at a constant elevation. A suction cup 50 is connected by a conduit to a source of suction not shown and is supported by a horizontally disposed arm 49 extending from the piston rod 54. The piston rod 54 is connected to a piston within cylinder 56. Cylinder 56 may be oscillated about its longitudinal axis by cylinder 58 which is connected thereto by the clevis 60. Such oscillation by the cylinder 56 facilitates movement of the arm 49 from the solid line position to the phantom position as shown in FIG. 6.

Figure 6:
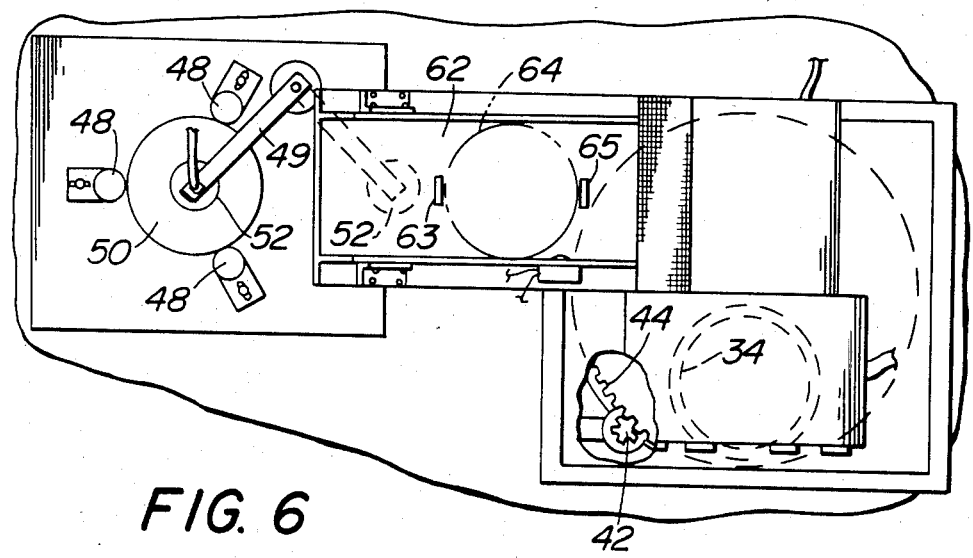
FIG. 6 is a top plan view of the apparatus shown in FIG. 5.

When the arm 49 is in the phantom position as shown in FIG. 6, the suction cup 52 is directly above an inclined chute 62. A disk 50 supported by suction cup 52 can be dropped onto the chute 62 where it will slide down to a first limit stop 63. When limit stop 63 is released, the disk is stopped by limit stop 65, thereby placing the disk 50 directly beneath the induction heater 64. See FIG. 6.

The disk feeder 46 and said limit stops are synchronized with the movement of table 24. A utensil which has been induction heated on holder 30 will oscillate to a position so as to be directly beneath the heated disk 50 as held by fingers 67. A microswitch for solenoids 69 is tripped by table 24. Thereafter, the support fingers 67 for disk 50 will be retracted by solenoids 69 and allow the disk 50 to fall a short distance directly down on top of the utensil 12. A screen guard 66 is provided for safety purposes.

As soon as the disk 50 lands on top of the bottom wall of utensil 12, the temperature of disk 50 raises to about 800° F. The advantage attained is that the disk is supported by the utensil before it reaches a temperature of about 800° F. since at that temperature the disk is too plastic to handle. The disk 50 and utensil 12 are immediately removed by an operator and placed on the anvil 70 of press 68 which is located a few feet away. Thereafter, the platen 72 descends and deforms the disk 50 and bonds the same with pressure of about 5,000 psi in one blow lasting 0.5 to 2 seconds to thereby produce the cookware as shown in FIG. 2. The metallurgical bond is characterized by interdiffusion with a thin layer of alloy on opposite sides of the interface having non-uniform serrations.

Thereafter, the cookware is air cooled in a conventional manner. Finishing steps are eliminated or minimized. If desired, the aluminum surface may be finished for cosmetic appearance to provide a brushed metal appearance. The time cycle of the present invention results in greater production. The use of a gas heater as taught by the prior art required a heating time of about 20 minutes. The induction heating steps only require about 15 seconds.

In contrast to the prior art, this invention utilizes a controlled grain boundary etch of the steel to create a random pattern of closely spaced serrations or channels into which the softer aluminum is forced during the bonding process. The localized movement of the aluminum is sufficient to disrupt the adsorbed oxygen or oxide film thereby facilitating a strong bond which is continuous and non-porous. A separation test resulted in a ductile fracture of the aluminum instead of a separation at the interface. A stronger metal to metal bond is achieved without significant reduction in thickness or lateral flow of the aluminum disk.

The present invention may be embodied in other specific forms without departing from the spirit or essential attributes thereof and, accordingly, reference should be made to the appended claims, rather than to the foregoing specification.

I claim:

1. Cookware comprising a stainless steel utensil having a bottom wall connected to an upstanding side wall by a curved portion, an aluminum disk metallurgically bonded directly to the bottom wall and the curved portion with a serrated key type interface, a central portion of said disk being thicker than the thickness of said utensil walls, said disk being thinner at its periphery, the thinned periphery of said disk overlying and terminating where the side wall joins said curved portion.

2. Cookware in accordance with claim 1 including an aluminum-stainless steel alloy on opposite sides of said interface.

3. Cookware in accordance with claim 1 wherein the exposed major surface of said disk is concave in the center thereof.

4. Cookware in accordance with claim 1, wherein said serrated interface is defined by serrations in the stainless steel utensil bottom wall.

5. Cookware in accordance with claim 4 wherein the serrations are defined by etched grain boundaries having a grain size of 5-15 microns over the entire contacting surfaces of the steel utensil and aluminum disk.

6. Cookware in accordance with claim 3, wherein said serrated interface is defined by serrations in the stainless steel utensil bottom wall.

7. Cookware in accordance with claim 2, wherein said serrated interface is defined by serrations in the stainless steel utensil bottom wall.

* * * * *